United States Patent
Heckelsberg

[15] 3,676,520
[45] July 11, 1972

[54] CONVERSION OF OLEFINS
[72] Inventor: Louis F. Heckelsberg, Bartlesville, Okla.
[73] Assignee: Phillips Petroleum Company
[22] Filed: Dec. 31, 1964
[21] Appl. No.: 422,550

[52] U.S. Cl.....................260/683 D, 260/668 R, 260/680 R
[51] Int. Cl............................................................C07c 3/62
[58] Field of Search..................260/683, 680, 668; 208/121, 208/112, 135

[56] References Cited

UNITED STATES PATENTS

| | | | |
|---|---|---|---|
| 2,933,542 | 4/1960 | Bain et al. | 260/675.5 |
| 3,261,879 | 7/1966 | Banks | 260/683 |
| 3,278,418 | 10/1966 | Wilson | 208/111 |

OTHER PUBLICATIONS

Blom et al. (I), Phenium Catalyst, Industrial and Engineering Chemistry, Vol. 54, No. 4 pages 16–22, April 1962 TP1A58

Blom et al (II), Try Re in your Catalyst Formulas, Hydrocarbon Processing and Petroleum Refiner, Vol. 42, No. 10, pages 132–134, October, 1963, TP690A1P4

Primary Examiner—Delbert E. Gantz
Assistant Examiner—C. E. Spresser
Attorney—Young and Quigg

[57] ABSTRACT

Olefin hydrocarbons are disproportionated by contacting with a catalyst comprising an oxide of rhenium.

11 Claims, No Drawings

CONVERSION OF OLEFINS

This invention relates to the disproportionation of olefin hydrocarbons. In one aspect, the invention relates to the disproportionation of olefin hydrocarbons by contact with a catalyst comprising rhenium oxide. In another aspect, the invention relates to catalysts for olefin hydrocarbon disproportionation.

By disproportionation according to this invention is meant the conversion of a hydrocarbon into similar hydrocarbons of both higher and lower number of carbon atoms per molecule. In the case of olefins, a mixture of new products is obtained comprising olefins of both higher and lower molecular weights. Such an operation is useful in many instances. For example, a more plentiful hydrocarbon can be converted to a less plentiful and, therefore, more valuable hydrocarbon. One instance of such a conversion occurs when the process of this invention is used to balance the olefin production of a naphtha cracking plant by disproportionating the large quantities of propylene into ethylene and butenes. The disproportionation of propylene to ethylene and butenes is a particularly valuable disproportionation reaction and approximately equimolar quantities of ethylene and butenes can be produced.

An object of this invention is to convert an olefin feed to hydrocarbons of higher and lower molecular weight.

Another object of this invention is to produce ethylene and butenes from propylene.

Another object of this invention is to provide catalysts for olefin hydrocarbon disproportionation.

Other aspects, objects and the advantages of my invention are apparent in the written description and the claims.

According to my invention, the disproportionation of an olefin hydrocarbon is accomplished by contacting the hydrocarbon with a catalyst comprising rhenium oxide and a catalyst base containing alumina, silica, silica-alumina, or magnesia-titania.

Olefins which are subject to disproportionation according to the process of this invention include acyclic olefins containing at least 3 carbon atoms per molecule, and their aryl derivatives and mixtures thereof. A useful group of these materials are monoolefins having three to 20 carbon atoms per molecule and mixtures thereof. The process has been most advantageously applied to mono-1- and 2-olefins and the conversion of propylene is particularly valuable.

The catalysts of this invention comprise a support containing silica, alumina, a combination of silica and alumina, or magnesia-titania or mixtures thereof. The base can contain other materials which do not substantially promote undesirable side reactions. For example, when using a silica, alumina, or silica-alumina base, magnesia or titania, or other bases in amounts which do not change the essential characteristics of the reaction, can be included. Of the materials suitable, any conventional catalytic grade material can be used. The support materials can be in a variety of forms, such as fine powders, coarse granules, or other forms or shapes. The finished catalyst, containing both the support and the promoter, can also be in the form of powders or granules as well as in other shapes, such as agglomerates, pellets, spheres, extrudates, and the like, depending upon the type of contacting technique to be utilized.

For example, any conventional catalytic grade of alumina, including eta or gamma forms, can be used. Small amounts of silica or magnesia can be used to make the base more resistant to surface area reduction by contact with moisture.

A silica component of the catalyst can be precipitated silica gel, microspheroidal silica gel, flame hydrolyzed silica, silica aerogel, etc. These materials have appreciable surface area, usually in the range of 50 to 700 m$^2$/g, and can range from fine powders to coarse granules. The materials sometimes contain small amounts of compounds of aluminum and/or sodium. Trace amounts of other metals, and small amounts of materials which do not change the characteristics of the catalyst appreciably are acceptable.

Silica-alumina bases are known to have catalytic activity for various hydrocarbon reactions, such as cracking and polymerization. These reactions can be substantially avoided in the process of the present invention by proper selection of the base, reaction temperatures and contact time. By careful selection of conditions, conversion predominantly to disproportionated products can be obtained with varying amounts of silica and alumina in the base, varying from 100 per cent alumina to 100 per cent silica.

The completed catalyst contains from 0.1 to about 30, preferably from 1 to about 15, weight per cent of rhenium oxide. A number of rhenium oxides are known in which the valence of rhenium varies from 2 to 7. Consequently, rhenium oxide compositions are likely to be mixtures containing several specific oxides. The most stable oxide is the heptavalent $Re_2O_7$. There is evidence that this compound is the most active for the promotion of olefin disproportionation and is a preferred promoter in the catalyst system of this invention. Therefore, although the other oxides are catalytically active, in general it is preferred to select conditions of catalyst preparation to provide for at least some $Re_2O_7$ to be present in the final catalyst composition. To this end, extreme temperatures are avoided in the drying stage unless adequate oxygen is present. The presence of some oxygen in the cool-down period also is beneficial. The presence of free oxygen in the system during actual olefin conversion should, however, be avoided.

The composite catalyst is prepared by suitable methods such as dry mixing, impregnation, or coprecipitation. Rhenium oxides or rhenium compounds convertible to an oxide by calcination are employed in the catalyst prepara-tion. A convenient method for the preparation of the catalyst is to dry blend the rhenium oxide and the support in a ball mill where intimate contact between the finely divided particles is achieved. The milled composite can be employed in the process in the finely divided state or can be pressed into pellets or tablets of various sizes and shapes. If desired, pelleted catalysts can be crushed to obtain particles having specific mesh size. Alternatively, a compound of rhenium which is not an oxide can be incorporated into a base following a treatment of the composite to convert the rhenium compound into rhenium oxide.

After the rhenium oxide promoter is associated with the support, the composite is subjected to an activation step before being utilized in the olefin conversion process. The activation technique comprises heating at elevated temperatures in the presence of a suitable flowing gas. Air is a preferred activation gas, although other gases, for example, inert gases such as nitrogen or the noble gases, can be used, provided that at least part of the rhenium present is in the oxide form at the completion of the activation. The catalysts are subjected to a temperature in the range of 700°–1500° F. for 0.5 to 20 hours or longer. Generally, longer activation periods are used with lower temperatures and shorter activation periods with higher temperatures. In some instances, the catalyst is heated serially in more than one gas.

The activated catalyst can be used, without regeneration, for runs of up to several hours or more, and can be regenerated. The regeneration is accomplished by suitable methods for regenerating oxide catalysts and can comprise the same steps used in the activation procedure.

The process of the invention can be carried out either batch-wise or continuously, using a fixed catalyst bed, a stirred batch reactor, a fluidized catalyst bed, or other contacting technique. Preferred reaction conditions, including conditions of temperature, pressure, flow rates, etc., vary somewhat depending upon the specific catalyst composition, the particular feed olefin, desired products, etc. In general, the reaction is carried out in vapor or liquid phase at temperatures from about 300°–1,100° F., at a pressure of 0–2000 psig. Although the disproportionation reaction of this invention is not directly dependent upon pressure, most economical operation, including combination with other steps of a complete plant including, for example, product separation and recovery, a pressure range of 200–600 psig can be used conveniently. Preferably, the temperature is selected within a range of 650°–1,100° F., and excellent results are obtained in the range of 700°–800° F. In continuous operations, weight hourly space velocities of 0.1–400 are used. In batch reactions, the catalyst comprises from 1 to about 40 weight percent of the reaction mixture and reaction times of about 1 minute to about 20 hours are used. If desired, paraffinic and/or cycloparaffinic hydrocarbons having up to about 12 carbon atoms per molecule can be employed as diluents for the reaction. Suitable diluents include, for example, propane, cyclohexane, methylcyclohexane, normal pentane, normal hexane, isooctane, dodecane, and the like, or mixtures thereof. The diluents should be non-reacting under the conditions of the disproportionation reaction.

At the end of the reaction period, the hydrocarbon phase is separated from the solid catalyst phase by suitable methods and subjected to product recovery. Techniques such as fractional distillation, solvent extraction, adsorption, and the like, can be employed for separation of products. Unconverted feed materials, diluents, or products not in the desired molecular weight range, can be recycled. The invention is illustrated further by the following examples.

EXAMPLE I 10 parts by weight of rhenium oxide ($Re_2O_7$) was ball milled with 90 parts by weight of a catalytic grade of silica gel for 4 hours. The fine powder which resulted from the milling was then formed into pills by compression. The pills were then broken up and the 20–40 mesh fraction was charged into a glass reactor tube. The tube and contents were then heated for 4 hours in flowing air at a temperature of 1,000° F. A quantity of glass beads preceded the catalyst bed in the reactor as a preheating zone. The activated catalyst bed was then cooled to 200° F. while nitrogen was used to flush the oxygen from the system.

Propylene was then admitted into the reaction tube at a gaseous space rate of 10 volumes of gas per volume of catalyst per minute and at atmospheric pressure. The conversion of propylene was demonstrated at several temperatures. The reaction temperature was progressively increased and periodic samples were taken from the reactor effluent and chromatographically analyzed. The samples were taken after operating about 10 minutes at each temperature level. The results of these runs are seen in the table below:

| temp., °F. | ethylene | propylene | 1-butene | Trans-2-butene | cis-2-butene | Conversion, % |
|---|---|---|---|---|---|---|
| 200 | t | 100 | t | t | t | 0 |
| 400 | 0.6 | 98.6 | 0.1 | 0.4 | 0.3 | 1.4 |
| 500 | 0.4 | 98.8 | 0.1 | 0.4 | 0.3 | 1.2 |
| 600 | t | 100 | t | t | t | 0 |
| 700 | 0.5 | 98.8 | 0.1 | 0.3 | 0.3 | 1.2 |
| 800 | 0.9 | 96.8 | 0.2 | 1.1 | 1.0 | 3.2 |
| 900 | 1.7 | 95.3 | 0.3 | 1.4 | 1.3 | 4.7 |
| 1000 | 1.2 | 96.3 | 0.4 | 1.1 | 1.0 | 3.7 |

It is seen from the preceding table that good results are obtained within the operating temperature range from about 650° through about 1,000° F. or higher. However, some conversion is also observed at temperatures in the range of 200°–600° F.

The catalyst, after use in the above runs, was given a treatment comprising 4 hours at 1,000° F. in flowing air. A temperature series was again carried out as above with substantially the same results. This demonstrates that this catalyst system of this process can be regenerated conveniently with air.

EXAMPLE II

The catalyst used in Example I was again reactivated by treatment at 1,000° F. in flowing air for 4 hours. After activation, it was cooled to 600° F. in flowing nitrogen. With apparatus and procedure identical to that in Example I, propylene was again converted at a gaseous space rate of 10 volumes of gas per volume of catalyst per minute and at atmospheric pressure. Conversion of propylene was observed at 600° and at 800° F. Samples of the effluent were taken at 10 minute intervals during this time. The results are seen in the table below.

| temp., °F. | ethylene | propylene | 1-butene | Trans-2-butene | cis-2-butene | Conversion, % |
|---|---|---|---|---|---|---|
| 600 | 0.7 | 97.8 | 0.2 | 0.7 | 0.6 | 2.2 |
| 600 | 0.3 | 99.5 | t | 0.1 | 0.1 | 0.5 |
| 600 | 0.2 | 99.6 | t | 0.1 | 0.1 | 0.4 |
| 600 | 0.2 | 99.6 | t | 0.1 | 0.1 | 0.4 |
| 800 | 1.1 | 96.8 | 0.2 | 1.0 | 0.9 | 3.2 |
| 800 | 0.7 | 98.0 | 0.1 | 0.6 | 0.6 | 2.0 |
| 800 | 0.5 | 98.7 | t | 0.4 | 0.4 | 1.3 |
| 800 | 0.5 | 98.9 | t | 0.3 | 0.3 | 1.1 |
| 800 | 0.4 | 99.2 | t | 0.2 | 0.2 | 0.8 |

The results of these runs show that the process utilizing this catalyst system is capable of converting propylene under conditions of extended operation.

Reasonable variation and modification are possible within the scope of my invention which sets forth a process for the disproportionation of olefins by contact with a catalyst comprising rhenium oxide and a base comprising alumina, silica-alumina, silica or magnesia-titania.

I claim:

1. A process which comprises disproportionating an acyclic olefin hydrocarbon by contacting said hydrocarbon with a catalyst activated in an atmosphere and under conditions to permit activation for disproportionation, said catalyst comprising an oxide of rhenium supported on a catalyst base under conditions, including conditions of temperature, pressure and contact time, suitable for obtaining a disproportionated product comprising higher and lower molecular weight olefins similar to said acyclic olefin hydrocarbon.

2. A disproportionation process which comprises contacting an olefin feed selected from the group consisting of acyclic olefin hydrocarbons and their aryl derivatives having from three to 16 carbon atoms per molecule and mixtures thereof with a catalyst consisting essentially of an oxide of rhenium supported on a base selected from the group consisting of silica, alumina, silica-alumina, magnesia-titania, and mixtures thereof, said rhenium oxide comprising from about 0.1 to about 30 weight per cent of said catalyst, under conditions, including conditions of temperature, pressure and contact time, suitable for obtaining a disproportionated product, selected within a temperature range of 300°–1100° F. and a pressure range of 0–2,000 psig, to produce a disproportionated product comprising higher and lower molecular weight olefins similar to said feed.

3. The process of claim 2 wherein said olefin feed comprises propylene and said higher and lower molecular weight olefins comprise ethylene and butene.

4. A disproportionation process which comprises contacting an olefin feed selected from the group consisting of acyclic olefin hydrocarbons and their aryl derivatives having three to 16 carbon atoms per molecule and mixtures thereof with a catalyst consisting essentially of a base selected from the group consisting of silica, alumina, silica-alumina, magnesia-titania, and mixtures thereof, promoted with 1 to 15 weight percent of an oxide of rhenium under conditions, including conditions of temperature, pressure and contact time, suitable for obtaining a disproportionated product selected within a temperature range of 650°–1,100° F. and a pressure range of 0–2,000 psig to produce a disproportionated product comprising higher and lower molecular weight olefins similar to said feed.

5. The process of claim 4 wherein said temperature is in the range of 700°–800° F.

6. A process for the disproportionation of an acyclic olefin hydrocarbon which comprises contacting an acyclic olefin hydrocarbon with a catalyst comprising rhenium heptoxide and a base selected from the group consisting of silica, alumina, silica-alumina, magnesia-titania and mixtures thereof under conditions of temperature and pressure which effect disproportionation of the feed and obtaining a mixture of olefins having lower and higher numbers of carbon atoms than the hydrocarbon.

7. A process which comprises disproportionating an acyclic olefin hydrocarbon by contacting said hydrocarbon with a catalyst activated in an atmosphere and under conditions to permit activation for disproportionation, said catalyst comprising rhenium heptoxide supported on a catalyst base under conditions, including conditions of temperature, pressure and contact time, suitable for obtaining a disproportionated product comprising higher and lower molecular weight olefins similar to said acyclic olefin hydrocarbon.

8. A process which comprises disproportionating an acyclic olefin hydrocarbon by contacting said hydrocarbon with a catalyst activated in an atmosphere and under conditions to permit activation for disproportionation, said catalyst comprising an oxide of rhenium supported on alumina under conditions, including conditions of temperature, pressure and contact time, suitable for obtaining a disproportionated product comprising higher and lower molecular weight olefins similar to said acyclic olefin hydrocarbon.

9. A process which comprises disproportionating an acyclic olefin hydrocarbon by contacting said hydrocarbon with a catalyst activated in an atmosphere and under conditions to permit activation for disproportionation, said catalyst comprising rhenium heptoxide supported on silica under conditions, including conditions of temperature, pressure and contact time, suitable for obtaining a disproportionated product comprising higher and lower molecular weight olefins similar to said acyclic olefin hydrocarbon.

10. A process which comprises disproportionating an acyclic olefin hydrocarbon by contacting said hydrocarbon with a catalyst activated in an atmosphere and under conditions to permit activation for disproportionation, said catalyst comprising rhenium heptoxide supported on silica-alumina under conditions, including conditions of temperature, pressure and contact time, suitable for obtaining a disproportionated product comprising higher and lower molecular weight olefins similar to said acyclic olefin hydrocarbon.

11. A process which comprises disproportionating an acyclic olefin hydrocarbon by contacting said hydrocarbon with a catalyst activated in an atmosphere and under conditions to permit activation for disproportionation, said catalyst comprising rhenium heptoxide supported on magnesia-titania under conditions, including conditions of temperature, pressure and contact time, suitable for obtaining a disproportionated product comprising higher and lower molecular weight olefins similar to said acyclic olefin hydrocarbon.

* * * * *